(12) United States Patent
Suzuki (10) Patent No.: US 11,820,506 B2
(45) Date of Patent: *Nov. 21, 2023

(54) AERIAL VEHICLE WITH COUNTERWEIGHT MECHANISM

(71) Applicant: AERONEXT INC., Shibuya-ku (JP)

(72) Inventor: Yoichi Suzuki, Tokyo (JP)

(73) Assignee: AERONEXT INC., Shibuya-Ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,720

(22) Filed: Oct. 14, 2021

(65) Prior Publication Data

US 2022/0033075 A1 Feb. 3, 2022

Related U.S. Application Data

(63) Continuation of application No. 16/619,066, filed as application No. PCT/JP2017/020729 on Jun. 4, 2017, now Pat. No. 11,148,806.

(51) Int. Cl.
*B64C 39/02* (2023.01)
*B64C 17/04* (2006.01)
(Continued)

(52) U.S. Cl.
CPC ............ *B64C 39/024* (2013.01); *B64C 17/04* (2013.01); *B64C 27/08* (2013.01); *B64U 10/13* (2023.01); *B64U 50/19* (2023.01); *B64U 2101/60* (2023.01)

(58) Field of Classification Search
CPC ......... B64C 17/02; B64C 17/04; B64C 17/08; B64C 2201/024; B64C 2201/027; B64U 10/13; B64U 10/17; B64U 10/11
See application file for complete search history.

(56) References Cited

U.S. PATENT DOCUMENTS

| 9,409,656 B2* | 8/2016 | Ohtomo | H04N 7/185 |
| 2011/0290937 A1* | 12/2011 | Salkeld | B64C 17/04 |
| | | | 348/E7.085 |

(Continued)

FOREIGN PATENT DOCUMENTS

| CN | 105857610 A | 8/2016 |
| EP | 2772725 A2 | 9/2014 |

(Continued)

OTHER PUBLICATIONS

Search Report and Written Opinon dated May 18, 2020 for European Patent Application No. 17912580.2.

(Continued)

*Primary Examiner* — Richard Green
*Assistant Examiner* — Arfan Y. Sinaki (57) ABSTRACT

An aerial vehicle has a loading section whereon a payload and the like can be loaded. The aerial vehicle is capable of traveling at least forward and backward, is provided with lift generation sections, arm sections for holding the lift generation sections, a loading section disposed on the arm sections and positioned posterior to the center of gravity of the aerial vehicle, and a maintaining means for maintaining the aerial vehicle at least in the horizontal attitude, and the loading section has a first connection part for maintaining a loaded object at least in the horizontal attitude. On the basis of the above mentioned, the payload can be prevented from entering slipstream regions created by propellers, improving flight efficiency.

1 Claim, 8 Drawing Sheets

(51) Int. Cl.
　　　*B64C 27/08*　　(2023.01)
　　　*B64U 10/13*　　(2023.01)
　　　*B64U 50/19*　　(2023.01)
　　　*B64U 101/60*　(2023.01)

(56) References Cited

U.S. PATENT DOCUMENTS

| | | | | |
|---|---|---|---|---|
| 2015/0021429 | A1* | 1/2015 | Reichert | B64C 27/04 244/17.11 |
| 2015/0021430 | A1 | 1/2015 | Paduano | |
| 2015/0120094 | A1 | 4/2015 | Kimchi et al. | |
| 2018/0141647 | A1* | 5/2018 | Suzuki | B64U 50/13 |
| 2018/0281947 | A1* | 10/2018 | Sakai | B64D 27/24 |
| 2019/0276140 | A1* | 9/2019 | Poltorak | B60W 20/10 |

FOREIGN PATENT DOCUMENTS

| | | | |
|---|---|---|---|
| JP | 2013079034 | A * | 5/2013 |
| JP | 2013079034 | A | 5/2013 |
| JP | 2016222031 | A | 12/2016 |
| JP | 6086519 | B1 | 3/2017 |
| JP | 6308642 | B1 | 4/2018 |
| WO | 2016189797 | A1 | 12/2016 |
| WO | 2016185572 | A1 | 7/2017 |

OTHER PUBLICATIONS

Examination Report dated Jul. 14, 2020 for Indian Patent Application No. 202037000463.
Search Report dated Jul. 25, 2017 for PCT Application No. PCT/JP2017/020729.
Decision to Grant a Patent dated Mar. 8, 2018 for Japanese Application No. 2017-550265.

* cited by examiner

AERIAL VEHICLE WITH COUNTERWEIGHT MECHANISM

CROSS-REFERENCE TO RELATED APPLICATIONS

The present application is a continuation of U.S. patent application Ser. No. 16/619,066 filed Dec. 3, 2019, now U.S. Pat. No. 11,148,806, which is a National Stage Entry of the International Application No. PCT/JP2017/020729 filed Jun. 4, 2017, the disclosure of which is incorporated herein by reference.

TECHNICAL FIELD

The present disclosure relates to an aerial vehicle and more particularly to an aerial vehicle having a mounting part that can be loaded with a load and the like.

BACKGROUND ART

In recent years, there have been attempts to deliver a load using an aerial vehicle such as a drone or an unmanned aerial vehicle (UAV) (hereinafter simply referred to as "aerial vechicle"). In Patent Document 1, a delivery system using an aerial vehicle is disclosed (for example, refer to Patent Document 1). The delivery system forms an item inventory for the delivery of a load to the delivery designation by the aerial vehicle (drone) autonomously.

PRIOR ART

Patent Document 1: United States Patent Publication No. 2015-0120094 A1

DESCRIPTION OF THE INVENTION

Technical Problem

The aerial vehicle of Patent Document 1 may have a problem that the flight efficiency is lowered particularly when moving forward in a load-mounted state.

Accordingly, the present disclosure is directed to provide an aerial vehicle that can improve flight efficiency.

Technical Solution

According to the present disclosure, an aerial vehicle capable of moving forward at least in a horizontal direction is provided, comprising:
a lift generating part:
an arm part for holding the lift generating part;
a mounting part provided on the arm part, the mounting part being located behind the center of gravity of the aerial vehicle; and
a maintenance means for maintaining the orientation of the aerial vehicle at least horizontally;
wherein the mounting part has a first connection part that maintains the orientation of a mounted object at least horizontally.

Advantageous Effects

According to the present disclosure, it is possible to provide an aerial vehicle capable of improving flight efficiency.

DETAILED DESCRIPTION OF THE INVENTION

The contents of the embodiment of the present disclosure will be listed and described. An aerial vehicle according to an embodiment of the present disclosure has the following configuration.

[Item 1]
An aerial vehicle capable of traveling at least in a front-rear direction including:
a lift generating part;
an arm part for holding the lift generating part;
a mounting part provided on the arm part, the mounting part being located behind the center of gravity of the aerial vehicle;
a maintenance means for maintaining the orientation of the aerial vehicle at least horizontally;
wherein the mounting part has a first connection part that maintains the orientation of a mounted object at least horizontally.

[Item 2]
The aerial vehicle as set forth in Item 1,
wherein the maintenance means additionally has a counterweight provided in front of the center of gravity of the aerial vehicle in the front-rear direction.

[Item 3]
The aerial vehicle as set forth in Item 2, wherein the maintenance means additionally has a second connection part for connecting the counterweight so as to be movable within a predetermined range.

[Item 4]
The aerial vehicle as set forth in Item 3,
wherein the second connection part connects the counterweight so as to be movable only in the front-rear direction.

[Item 5]
The aerial vehicle as set forth in any one of Items 2 to 4,
wherein the counterweight is battery of the aerial vehicle.

[Item 6]
The aerial vehicle as set forth in any one of Items 1 to 5,
wherein the lift generating unit is a plurality of rotor blades that generate a wake, and a wake region is generated by the rotor blades during flight of the aerial vehicle,
wherein when the aerial vehicle moves at least in the front-rear direction, the numbers of rotations of the rotor blades rearward in the traveling direction are made larger than the numbers of rotations of the rotor blades forward in the traveling direction, and wherein the mounting part is located on the main body part so that the mounted object is outside the wake region when the aerial vehicle travels.

[Item 7]

The aerial vehicle as set forth in Item 6, wherein the mounting part is provided at a position where the rotating blades and the mounted object do not overlap when viewed from above the rotating blades.

[Item 8]

The aerial vehicle as set forth in any one of Items 1 to 7, wherein the first connection part connects the mounting part so as to be movable only in the front-rear direction.

Details of the Embodiment

Hereinafter, an aerial vehicle according to an embodiment of the present disclosure will be described with reference to the drawings.

<Background>

A conventional aerial vehicle used in a delivery system is not an aircraft that can handle the updraft generated by high-rise buildings. Currently, an aerial vehicle called a delivery aerial vehicle is an aerial vehicle that is converted from a general aircraft used as an aerial photography aircraft or the like, to be used as a delivery aerial vehicle. The following technical problems occur when a general aircraft is converted into a delivery aerial vehicle.

A general aircraft is tilted by the wind. When converting a general aircraft to a delivery aerial vehicle, it is necessary to quickly deliver a load from a starting point to a destination while maintaining the position of the load immediately before the start of the delivery. This is because, as the aerial vehicle tilts, the load delivered by the aerial vehicle also inevitably tilts.

A general aircraft can be easily tilted by the wind. In addition, it is necessary to incline to move forward. If the load delivered by the aircraft tilts even for a moment, the commercial value of the load is lost. In particular, when the load delivered by the aircraft is a food including a home delivery pizza, a home delivery sushi, confectionery, or liquid such as a beverage, the business loss due to the inclination of the aerial vehicle is large. The same is true if the aircraft delivers daily necessities.

Further, at the timing just before a general aircraft lands on the destination, the general aircraft may be tilted by an air current generated by a high-rise building or the like. A general aircraft that is tilted by an air current first brings one leg on one side of the aircraft into contact with the destination. The aircraft must bring another leg on the other side into contact with the destination afterwards. Since a leg on one side of the aircraft is in contact, until one leg on the other side comes into contact with the destination, it is not possible to maintain the tilt of the airframe that properly handles the air current. As a result, the airframe may be dropped to leeward, or may lose balance and be overturned. That is, there is a problem that the aircraft is overturned immediately before landing at the destination due to the air current generated at the destination. In particular, in the case where a gain is set high in order to handle the payload (load) mounted on the lower part of the general aircraft, the possibility of being overturned is high.

In addition, a load delivered by an aerial vehicle might be delivered from a delivery starting point to a destination in several minutes to several tens of minutes depending on a customer's need. This is because the merchandise value could be lost if the merchandise is not delivered promptly. However, the flight speed of a general aircraft might not be sufficient from the perspective of delivering goods promptly.

An aerial vehicle may need to deliver a load accurately from a delivery starting point to a destination. An operator of the aerial vehicle may need to accurately grasp a current position from the delivery starting point to the destination by using a GPS device or the like and operate the aerial vehicle. However, when the aerial vehicle is tilted, the GPS antenna provided on the aerial vehicle is also tilted. As a result, there is a problem that the GPS reception sensitivity of the aerial vehicle is lowered. Furthermore, there is a problem that immediately after the delivery and unloading of the load from the aerial vehicle, the balance may be lost and the aerial vehicle may be turned over or fall.

Figure 1A:
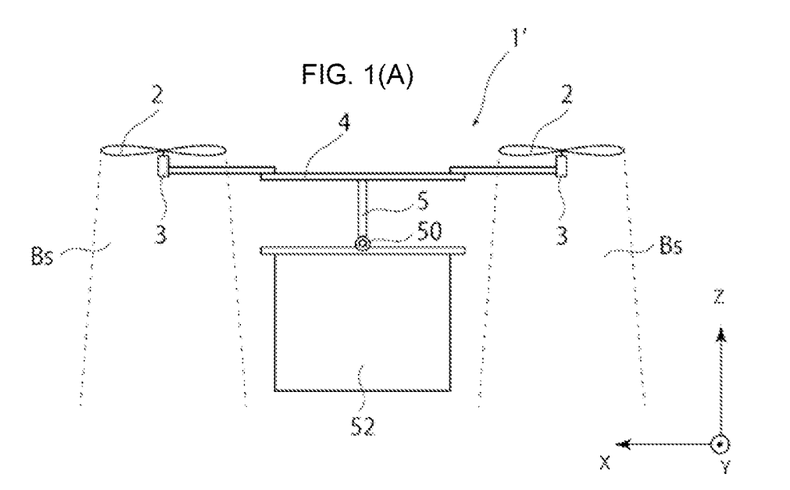
FIG. 1(A) is a schematic view illustrating a state (A) of an aerial vehicle when a conventional aerial vehicle is ascending and FIG. 1(B) is a schematic view illustrating a state (B) of the aerial vehicle when traveling.
Figure 1B:
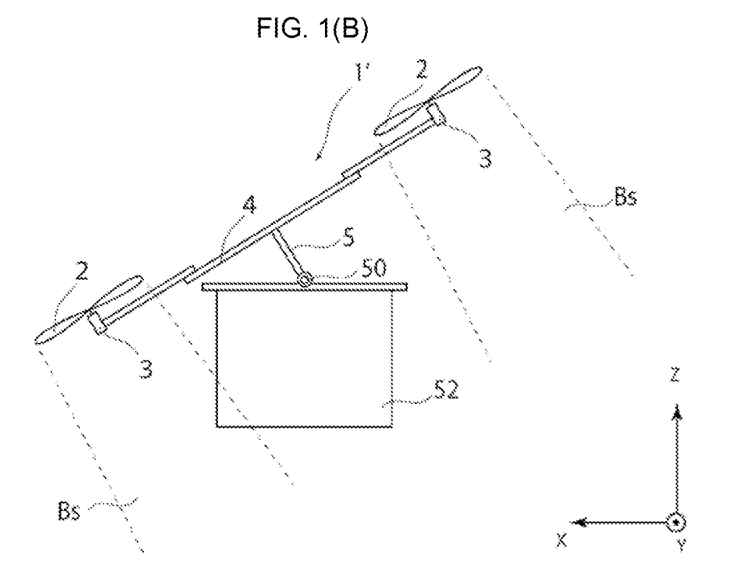

In order to solve the above-mentioned problems in the conventional aircraft, by providing a hinge 50 on the aerial vehicle 1' as shown in FIG. 1(A), the orientation of the load 52 can be maintained horizontally even when moving forward as shown in FIG. 1(B). However, as understood from FIG. 1(B), when the aerial vehicle is moving forward, since the load 52 enters a wake region Bs where a wake flow is generated by a propeller 2 of the aerial vehicle 1', the flight efficiency is poor.

Detailed Description of an Embodiment of the Present Disclosure

Figure 2:
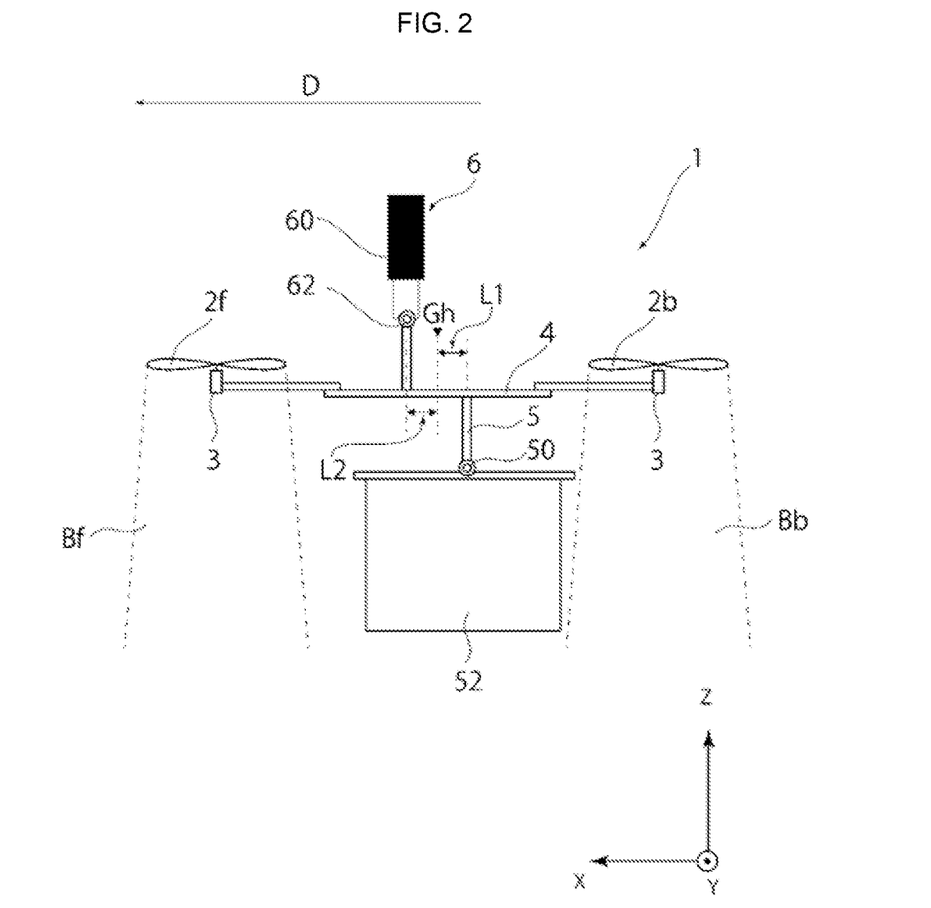
FIG. 2 is a view illustrating a state when an aerial vehicle is ascending and hovering according to the present embodiment.

As shown in FIG. 2, the aerial vehicle 1 according to the embodiment of the present disclosure is provided with a propeller 2 (lift generating part: rotor blade), a motor 3 for rotating the propeller 2, an arm 4 provided with the motor 3, a mounting part 5 on which a load 52 is mounted, and a battery unit 6 as a counterweight. The aerial vehicle 1 moves forward along the direction of arrow D (+X direction) in the drawing as the traveling direction (details will be described later).

In the following description, terms may be used according to the following definitions.

Front-rear direction: +X direction and X direction

Up-down direction (or vertical direction): +Z direction and Z direction

Left-right direction (or horizontal direction): +Y direction and Y direction

Traveling direction (forward): +X direction

Reverse direction (backward): −X direction

Ascending direction (upward): +Z direction

Descending direction (downward): −Z direction

The propeller 2 receives the output from the motor 3 to rotate. As the propeller 2 rotates, a propulsive force is generated for taking off the flying body 1 from a starting point, horizontally moving it, and landing it at a destination. The propeller 2 can rotate rightward, stop, and rotate leftward.

The propeller 2 of the present disclosure has a blade with a thin, elongated shape. The number of blades (rotors) may be any number (e.g., 1, 2, 3, 4, or more blades). Further, the shape of the blades can be any shape such as a flat shape, a bent shape, a twisted shape, a tapered shape, or a combination thereof. In addition, the shape of the blades can be transformed (for example, size-adjustable, foldable, bendable, etc.). The blades can be symmetrical (having the same upper and lower surfaces) or asymmetric (having differently shaped upper and lower surfaces). The blade can be formed to be an airfoil, a wing, or to have a geometrical form preferable for generating dynamic aerodynamic forces (e.g., lift, thrust) when the blade moves through the air. The geometrical form of the blade can be selected appropriately to optimize the dynamic air characteristics of the blade, such as increasing lift and thrust and reducing drag.

The motor 3 causes the propeller 2 to rotate. For example, the drive unit may include an electric motor or an engine or the likes. The blades can be driven by the motor and rotate around an axis of rotation of the motor (e.g., the long axis of the motor) in a clockwise and/or counterclockwise direction.

All the blades can rotate in the same direction, or rotate independently. Some of the blades rotate in one direction and the other blades rotate in the other direction. All of the blades can be rotated at the same rotational speed, and can also be rotated at different rotational speeds. The number of rotations can be determined automatically or manually based on the dimensions (for example, size, weight) and the control state (speed, moving direction, etc.) of the moving body.

An arm 4 is a member that supports corresponding motors 3 and propellers 2. The arm 4 may be provided with a color displaying body such as an LED to indicate the flight state, flight direction, etc. of the rotorcraft. The arm 4 according to the present embodiment can be formed of a material appropriately selected from carbon, stainless steel, aluminum, magnesium, etc. or alloys or combinations thereof.

The mounting unit 5 is a mechanism for mounting and holding a load 52. The mounting unit 5 always maintains the state in a predetermined direction (for example, the horizontal direction (vertically downward)) so that the position and orientation of the mounted load 52 can be maintained.

Figure 4:
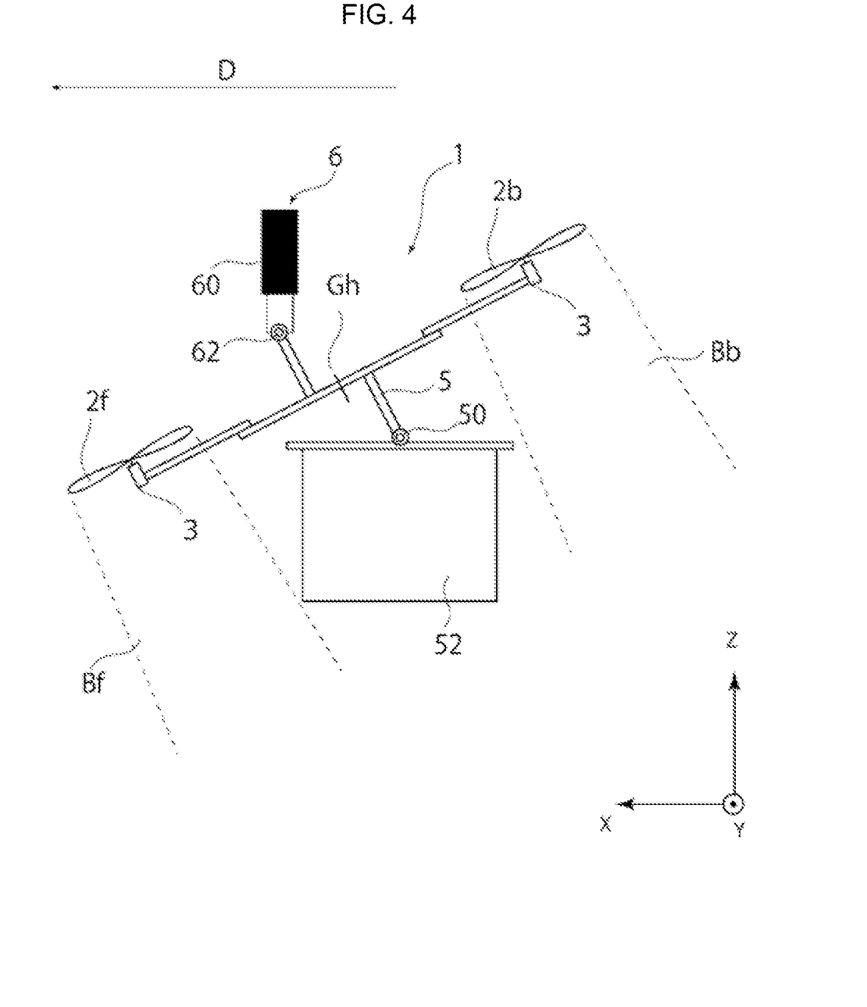
FIG. 4 is a view illustrating a state when the aerial vehicle of FIG. 2 is traveling.

More specifically, the mounting part 5 has a hinge (gimbal) 50, and the load 52 is bent according to the inclination of the aerial vehicle 1 with the hinge 50 as a fulcrum. The angle at which the hinge 50 is bent is not particularly limited. For example, as shown in FIG. 4, it is only necessary that the position and orientation of the load 52 can be maintained horizontally even when the aerial vehicle 1 flies in a posture of leaning forward. Thus, the load 52 is always held in a state of being suspended vertically downward, and it becomes possible to deliver the load 52 to the destination while maintaining the position and state at the starting point. The hinge 50 according to the present embodiment is movable only in the front-rear direction, which is the same direction as the traveling direction. However, it may be movable in the left-right direction.

The hinge 50 may be controlled by a motor or the like. As a result, wobbling (natural vibration or the like) of the load 52 during flight is further prevented.

The shape, mechanism of the mounting part 5 is not particularly limited as long as the load 52 can be accommodated or held, and it can be anything as long as the load 52 mounted on a first mounting part 30 can be tilted or held in its position.

Figure 3:
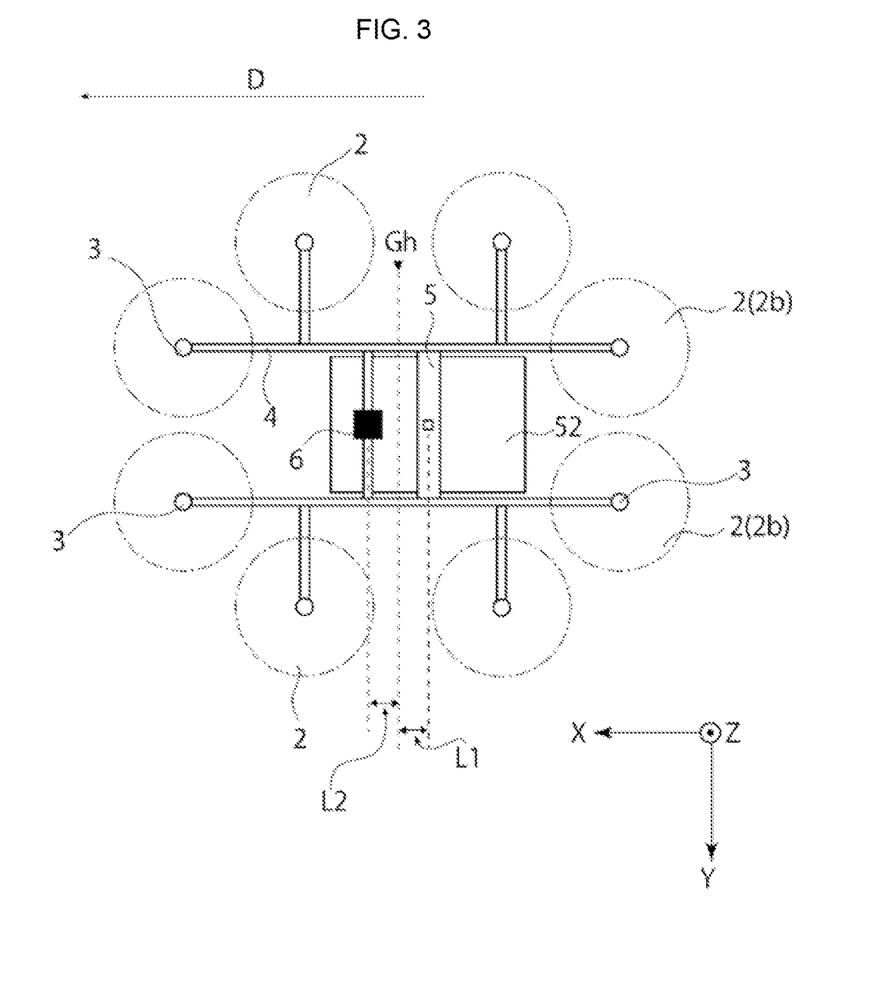
FIG. 3 is a view of the aerial vehicle of FIG. 2 as viewed from above.

As shown in FIGS. 2 and 3, the mounting part 5 according to the present embodiment is provided behind the center of gravity Gh in the front-rear direction of the aerial vehicle 1 in the traveling direction D by a predetermined distance L1. The predetermined distance L1 is determined so that the load 52 does not overlap in the vertical direction, even partially, with at least the circular area generated by the rear propeller 2b (refer to the area indicated by the one-dot chain line of the propeller 2b in FIG. 3). In other words, the predetermined distance L1 is set to a value such that the rotating propeller 2 and the load 52 do not overlap when viewed from above the propeller 2. More preferably, the load 52 is provided at a position not affected by the wake region Bb generated from the rear propeller 2b. The mounting part 5 can be provided at any position on the arm. Further, the position can be changed by sliding or the like after being attached.

The battery unit 6 has a battery 60, such as a lithium ion secondary battery (Li—Po battery or the like), and a hinge 62. The battery unit 6 according to the present embodiment is provided at least in front of the center of gravity, and has a function as a counterweight that balances with the above-described mounting part 5 in the front-rear direction. Details of the function will be described later. The hinge 62 is configured such that the battery 60 rotates along the front-rear direction with the hinge 62 as a fulcrum. The angle at which the hinge 62 rotates is not particularly limited. Further, the hinge 62 has a motor (not shown) for controlling the direction (orientation) of the hinge 62, and it is possible to change the direction of the battery 60 in response to an instruction from a control unit (not shown: described later). The hinge 62 according to the present embodiment is movable only in the front-rear direction, which is the same direction as the traveling direction. However, it may be movable in the left-right direction.

<Description of Flight Modes>

Subsequently, the flight modes of the aerial vehicle 1 according to the present embodiment will be described with reference to FIGS. 2, 4 to 6. Further, in the following description, in order to clarify the explanations, each of the four modes of ascending, moving horizontally, descending, and ascending again will be described. Of course, a mode of flying by a combination of these modes such as ascending while moving horizontally, for example, is also included.

<When Ascending>

As shown in FIG. 2, a user operates a transmitter for radio control having an operation unit to increase the output of the motor 3 of the flying body and increase the rotation speed of the propeller 2. When the propeller 2 rotates, a lift necessary to lift the aerial vehicle 1 is generated vertically upward. When the lift exceeds the gravity acting on the aerial vehicle 1, the aerial vehicle 1 leaves the ground and takes off from the starting point.

As shown in the figure, the aerial vehicle 1 including the arm 4 is maintained horizontally as a whole when ascending. At this time, the orientation of the battery unit 6 is maintained vertically upward. In other words, when the lift generated by each of the propellers 2 is the same, the gravity applied to the aerial vehicle 1 in the front-rear direction coincides with the center of gravity Gh (the rotational moments about the left-right direction around the center of gravity Gh counteract). Thereby, the aerial vehicle 1 can ascend while maintaining a horizontal posture.

In addition, it is possible to change the orientation of the battery unit 6 depending on the weight of the load 52. That is, in the case of a light load, the battery 6 is tilted backward, and in the case of a heavy load, the battery unit 6 is tilted forward to balance.

Further, in the case where the weight applied to the aerial vehicle 1 and the lift generated on the aerial vehicle 1 due to the rotations of the propellers 2 are dynamically balanced, the aerial vehicle 1 can hover. At this time, the altitude of the aerial vehicle 1 is maintained at a constant level. The aerial vehicle 1 in the present embodiment maintains the same posture as in FIG. 2 described above even during hovering.

<When Moving Horizontally>

In the case where the aerial vehicle 1 travels in the horizontal direction, the aerial vehicle 1 is controlled so that the number of revolutions of propellers 2 located rearward in the traveling direction is greater than the number of revolutions of propellers 2 located forward in the traveling direction. Therefore, as shown in FIG. 4, when moving horizontally in the traveling direction, the aerial vehicle 1 has a posture of leaning forward. At this time, the battery unit 6 is balanced by falling behind the hinge 62. At this time, due to the presence of the hinge 50, the orientation of the load 52 is kept horizontal.

As can be understood by comparing FIG. 1(B) and FIG. 4, since the mounting part 5 is located behind the center of gravity Gh, the load 52 is not located in the wake regions Bf and Bb of the propeller 2f and the propeller 2b, respectively. Therefore, according to the aerial vehicle 1 of the present embodiment, it is possible to increase the flight efficiency at least when traveling in the horizontal direction.

<When Descending (at the Time of Landing)>

Figure 5:
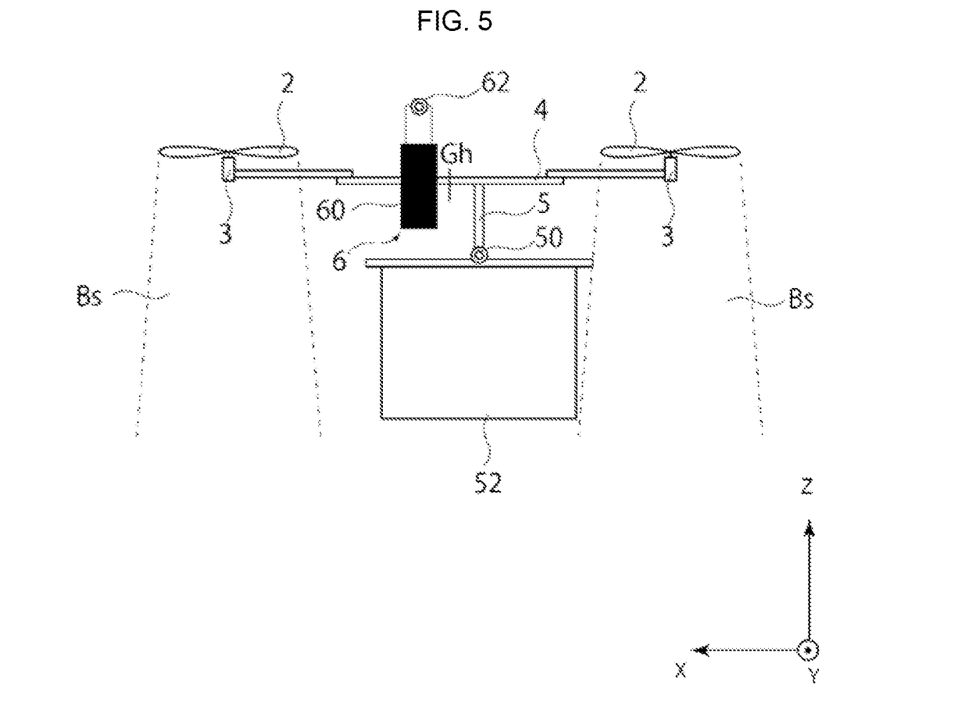
FIG. 5 is a view illustrating a state when the aerial vehicle of FIG. 2 is descending.
Figure 6:
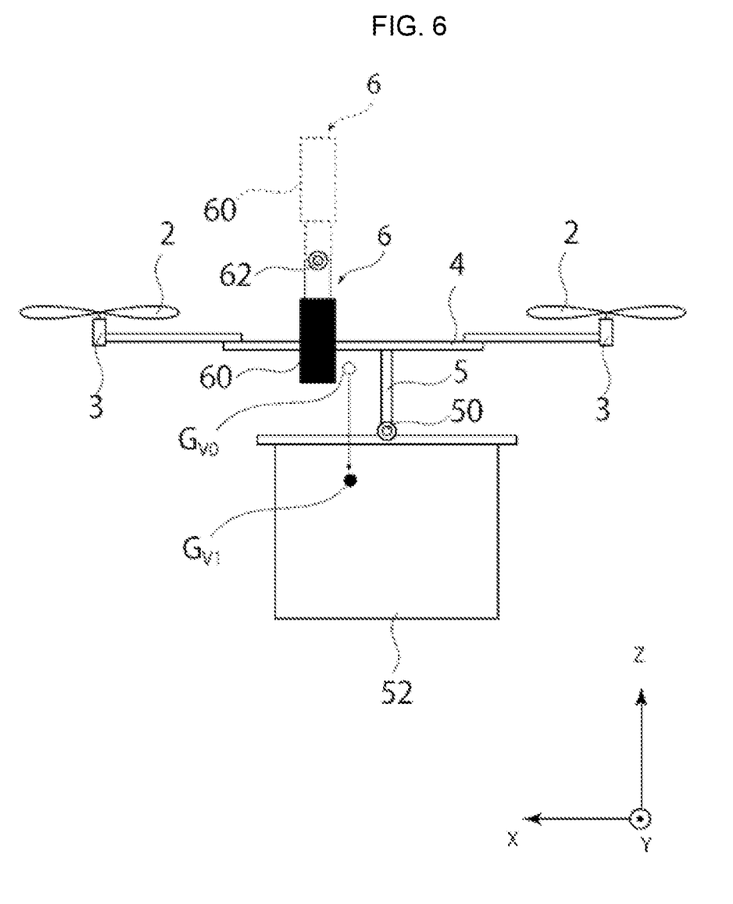
FIG. 6 is another view illustrating a state when the aerial vehicle of FIG. 2 is descending.

As shown in FIG. 5, when descending, the battery unit 6 rotates with respect to the hinge 62 to face downward. When an upward force is applied to a general aerial vehicle 1 due to an updraft, there is a risk of crashing due to the general aerial vehicle 1 losing balance. However, since the aerial vehicle 1 sets the battery unit 6 vertically downward before descending, the center of gravity of the flying body 1 is lowered in the vertical direction (see position $G_{v0}$ and $G_{v1}$ before the movement of the battery unit 6 schematically shown in FIG. 6). By lowering the center of gravity of the aerial vehicle 1, the upward force applied to the aerial vehicle 1 by the rising airflow can be canceled out. As described above, the aerial vehicle 1 according to the present embodiment can also counter the force generated by the rising airflow by appropriately combining means for lowering the center of gravity Gh of the aerial vehicle 1.

The aerial vehicle 1 lands at the destination and lowers the load 52 mounted on the mounting part 5 on the destination. That is, the aerial vehicle 1 and the load 52 are separated at the destination. Separation of the aerial vehicle 1 and the load 52 is performed by separating the load 52 from the mounting part 5. The aerial vehicle 1 of the present embodiment does not have landing legs in order to reduce the weight. Therefore, when landing, the mounted load 52 itself has the function of landing legs. However, landing legs may be provided according to circumstances such as the characteristics of the load.

Usually, immediately after the load L is separated from the aerial vehicle 1, the payload becomes small, and the center of gravity of the flying body 1 may be instantaneously moved upward. However, as described with reference to FIG. 6, the aerial vehicle 1 changes the orientation of the battery unit 6 to face vertically downward after arriving over the destination, and has the center of gravity positioned vertically downward from the center of the lift (hereinafter referred to as the "lift center") generated by the propellers from. For this reason, even after the load 52 is separated from the aerial vehicle 1, the position of the center of gravity can still be positioned below the lift center in the vertical direction.

<When Ascending Again>

Figure 7:
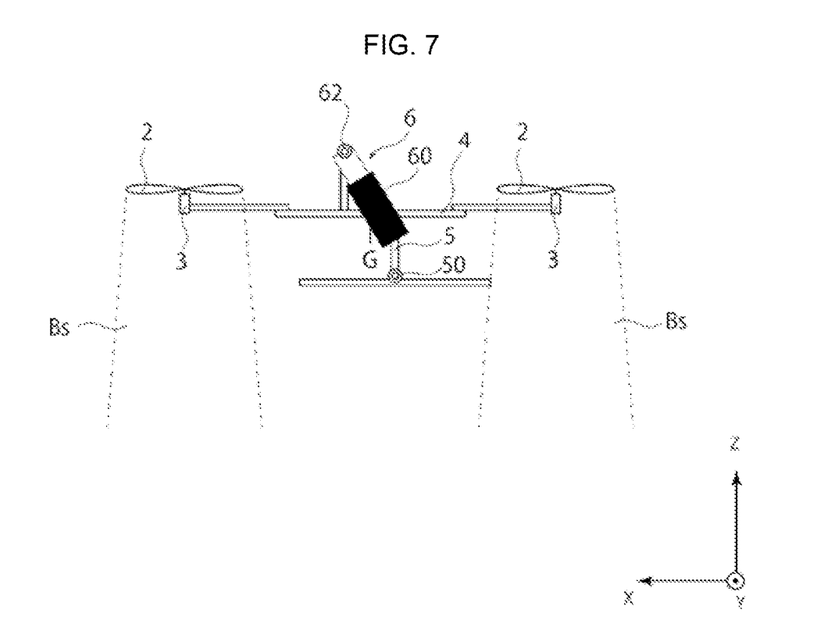
FIG. 7 is a view illustrating a state (when ascending again) after the aerial vehicle of FIG. 2 detaches the load.

As shown in FIG. 7, after the load 52 is separated from the mounting part 5, the battery unit 6 further rotates rearward. Thereby, it is possible for the aerial vehicle 1 to balance out the change of the center of gravity due to the separation of the load 52. The battery unit 6 in the present embodiment includes a lock mechanism (not shown). The lock mechanism locks the battery unit 6 at the position shown in FIG. 7. The aerial vehicle 1 ascends again in this state and returns to a designated place such as the starting point.

In the embodiment described above, the battery unit is used as the counterweight for balancing with the mounting part 52. However, the means for balancing the mounting part 52 is not limited thereto. For example, the rotation speeds of the propellers 2 can be changed.

Figure 8:
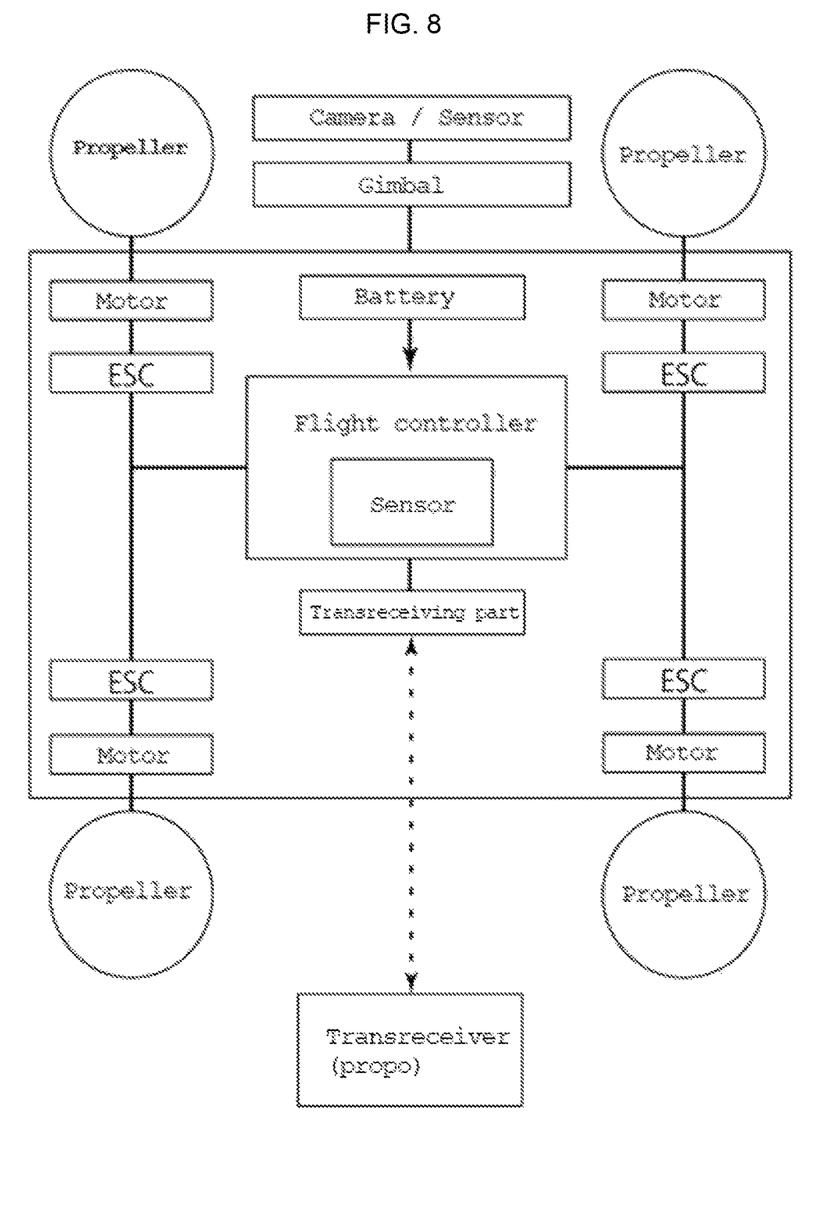
FIG. 8 is a general functional block diagram of an aerial vehicle.

The above-described aerial vehicle has, for example, a functional block diagram as shown in FIG. 8. In addition, the functional block diagram of FIG. 8 is a minimum reference structure. A flight controller is a so-called processing device. The processing unit may have one or more processors, such as a programmable processor (e.g., a central processing unit (CPU)). The processing unit has a memory (not shown) and it is possible to access the memory. The memory stores logic, codes, and/or program instructions that can be executed by the flight controller to perform one or more steps. The memory may include, for example, a separable medium such as an SD card or random access memory (RAM) or an external storage device. Data obtained from cameras and sensors may be transmitted directly to the memory and stored. For example, still image dynamic image data taken by a camera or the like is recorded in a built-in memory or an external memory.

The processing unit includes a control module configured to control the state of the aerial vehicle. For example, the control module may control a propulsion mechanism (motors and the likes) in order to adjust the spatial arrangement, velocity, and/or acceleration of the aerial vehicle having six degrees of freedom (translational motions x, y, and z, and rotational motions θx, θy, and θz). The control module can control one or more of the states of a mounted part and sensors.

The processing unit can communicate with a transreceiver configured to send and/or receive data from one or more external devices (e.g., a terminal, a display device, or other remote controller). The tranresceiver can use any suitable communication means such as wired or wireless communication. For example, the transreceiver can use one or more of a local area network (LAN), a wide area network (WAN), infrared, wireless, WiFi, point-to-point (P2P) network, telecommunication network, cloud communication, and the like. The tranresceiver can transmit and/or receive one or more of, data acquired by sensors, processed results generated by the processing unit, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

The aerial vehicle of the present disclosure can be expected to be used as a aerial vehicle dedicated to home delivery, and to be used as an industrial aerial vehicle in a warehouse or a factory. In addition, the aircraft of the present disclosure can be used in airplane-related industries such as multicopters and drones. Furthermore, the present invention can be suitably used as an aerial photography aircraft equipped with a camera or the like, and can also be used in various industries such as security field, agriculture, and infrastructure monitoring.

The above-described embodiments are merely examples for facilitating the understanding of the present invention, and are not intended to limit the interpreration of the present invention. The present invention can be modified and improved without departing from the gist thereof, and it goes without saying that the equivalents are included in the present invention.

DESCRIPTION OF REFERENCE NUMERALS

1, 1' aerial vehicle
2, 2f, 2b propeller(s) (lift generating part(s))
3 motor
4 arm (arm part)
5 mounting part
6 battery unit (counterweight)
50, 62 hinge
52 load (mounted object)
60 battery

The invention claimed is:

1. An aerial vehicle, comprising:
a lift generating part;
an arm part for holding the lift generating part;
a mounting part attached to a first portion of the arm part, that is located behind a center of gravity of the aerial vehicle in a traveling direction of the aerial vehicle, the mounting part configured to hold a mounted object;
a counterweight part for maintaining an orientation of the aerial vehicle at least horizontally, the counterweight part attached to a second portion of the arm part that is located in front of the center of gravity of the aerial vehicle in the traveling direction,
wherein the mounting part includes a first part, a second part, and a connection part, the first part being attached to the arm part, the second part being attached to the mounted object, the connection part connecting the first and the second parts to each other and being used to maintain an orientation of the mounted object at least horizontally,
wherein the lift generating part includes a plurality of rotor blades that generate a wake, and wake regions are generated by the rotor blades during flight of the aerial vehicle, and
wherein the mounting part is located on the arm part so that the mounted object is outside the wake regions when the aerial vehicle travels.

* * * * *